US012737310B2

(12) United States Patent
Park et al.

(10) Patent No.: US 12,737,310 B2
(45) Date of Patent: Sep. 15, 2026

(54) SEMICONDUCTOR CHIPS AND SEMICONDUCTOR PACKAGES SETTING BIT ORGANIZATION BASED ON OPERATION VOLTAGE

(71) Applicant: SK hynix Inc., Icheon-si (KR)

(72) Inventors: Joon Hong Park, Icheon-si (KR); Dae Han Kwon, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/351,910

(22) Filed: Jul. 13, 2023

(65) Prior Publication Data

US 2024/0320172 A1 Sep. 26, 2024

(30) Foreign Application Priority Data

Mar. 23, 2023 (KR) ........................ 10-2023-0038233

(51) Int. Cl.

| | |
|---|---|
| ***G06F 13/20*** | (2006.01) |
| ***G11C 5/14*** | (2006.01) |
| ***G11C 7/10*** | (2006.01) |
| ***G11C 7/22*** | (2006.01) |
| ***G11C 11/4063*** | (2006.01) |
| ***G11C 11/413*** | (2006.01) |
| ***H10B 80/00*** | (2026.01) |
| ***H10W 72/00*** | (2026.01) |

(52) U.S. Cl.
CPC .................................... *G06F 13/20* (2013.01)

(58) Field of Classification Search
CPC ............................ H03K 17/002; H01M 10/441
See application file for complete search history.

(56) References Cited

U.S. PATENT DOCUMENTS

| | | | | |
|---|---|---|---|---|
| 2002/0149405 | A1* | 10/2002 | Makino | G06F 1/10 327/141 |
| 2006/0098513 | A1 | 5/2006 | Kim et al. | |
| 2009/0302821 | A1* | 12/2009 | Kluge | G11C 5/143 323/311 |
| 2011/0026293 | A1* | 2/2011 | Riho | G11C 5/063 365/63 |
| 2012/0044010 | A1* | 2/2012 | Murakami | H03K 19/017509 327/333 |
| 2017/0005648 | A1* | 1/2017 | Chiu | H03K 17/002 |
| 2018/0019709 | A1* | 1/2018 | van den Berg | H02M 1/082 |
| 2018/0204827 | A1* | 7/2018 | Betsui | H01L 25/18 |

FOREIGN PATENT DOCUMENTS

| | | |
|---|---|---|
| KR | 1020040092723 A | 11/2004 |

* cited by examiner

*Primary Examiner* — Getente A Yimer
(74) *Attorney, Agent, or Firm* — WILLIAM PARK AND ASSOCIATES LTD.

(57) ABSTRACT

A semiconductor chip includes a first input/output control circuit configured to generate a first input/output switching signal that controls a first data input/output operation on a first data input/output group according to a first input voltage generated based on an operation voltage, and a second input/output control circuit configured to generate a second input/output switching signal that controls a second data input/output operation on a second data input/output group according to a second input voltage generated based on the operation voltage.

20 Claims, 14 Drawing Sheets

| | COM1 | COM2 | COMS |
|---|---|---|---|
| PIN1≥VREFA | L | H | H |
| VREFB≤PIN1<VREFA | H | H | L |
| PIN1<VREFB | H | L | L |

1
11
10
100
119
GIO
SD CTR(1)
SD CTR(2)
IO
117_1
117_2
115_1
115_2
115_3
115_4
'H'
IO_SW1
'L'
IO_SW2
IO_SW3
IO_SW4
IO CNT (1)
IO CNT (2)
IO CNT (3)
IO CNT (4)
113_1
113_2
113_3
113_4
'VDDQ'
PIN1
'VSS'
PIN2
PIN3
PIN4
PWR
PDN(1)
PDN(2)
PDN(3)
PDN(4)
110_1
110_2
110_3
110_4
111_1
111_2
111_3
111_4
VDDQ
VSS
SUB PDN
PKG SUB

SEMICONDUCTOR CHIPS AND SEMICONDUCTOR PACKAGES SETTING BIT ORGANIZATION BASED ON OPERATION VOLTAGE

CROSS-REFERENCE TO RELATED APPLICATIONS

The present application claims priority under 35 U.S.C. 119(a) to Korean Application No. 10-2023-0038233, filed on Mar. 23, 2023, in the Korean Intellectual Property Office, which is incorporated herein by reference in its entirety.

BACKGROUND

1. Technical Field

The present disclosure generally relates to semiconductor chips and semiconductor packages setting bit organization, based on an operation voltage.

2. Related Art

Recently, as electronic devices to which semiconductor chips are applied become smaller and lighter, multi-chip packaging technology for configuring a plurality of semiconductor chips into one semiconductor package is being applied. The multi-chip packaging technology includes a method of stacking a plurality of semiconductor chips and a method of arranging a plurality of semiconductor chips in parallel. In the former case, because semiconductor chips are stacked, a mounting area may be reduced. In the latter case, because a plurality of semiconductor chips are arranged on a plane, there are advantages in terms of having a simple process and thinner thickness.

The data input/output speed of the semiconductor chip included in a semiconductor package is determined based on a bit organization. The bit organization is set to X8, X16, and X32 based on the number of bits of data input/output simultaneously. X8 indicates a bit organization in which 8-bit data is input/output simultaneously, X16 indicates a bit organization in which 16-bit data is input/output simultaneously, and X32 indicates a bit organization in which 32-bit data is input/output simultaneously.

SUMMARY

According to an embodiment, the present disclosure may provide a semiconductor chip including a first input/output control circuit configured to generate a first input/output switching signal that controls a first data input/output operation on a first data input/output group according to a first input voltage generated based on an operation voltage, and a second input/output control circuit configured to generate a second input/output switching signal that controls a second data input/output operation on a second data input/output group according to a second input voltage generated based on the operation voltage.

In addition, according to another embodiment, the present disclosure may provide a semiconductor chip including a first voltage distribution circuit configured to generate a first input voltage based on an operation voltage, a first input/output control circuit configured to generate a first input/output switching signal that controls a first data input/output operation on a first data input/output group according to the first input voltage, a second voltage distribution circuit configured to generate a second input voltage based on the operation voltage, and a second input/output control circuit configured to generate a second input/output switching signal that controls a second data input/output operation on a second data input/output group according to the second input voltage.

In addition, according to further another embodiment, the present disclosure may provide a semiconductor package including a package substrate configured to apply an operation voltage including a data input/output voltage and a ground voltage through a substrate voltage distribution circuit, and a semiconductor chip configured to generate a first input voltage and a second input voltage based on the operation voltage, to generate a first input/output switching signal that controls a first data input/output operation on a first data input/output group according to the first input voltage, and to generate a second input/output switching signal that controls a second data input/output operation on a second data input/output group according to the second input voltage.

BRIEF DESCRIPTION OF THE DRAWINGS

FIG. 1 is a block diagram illustrating a configuration of a semiconductor package according to an embodiment of the present disclosure.

FIG. 6 is a timing diagram illustrating an operation of the composite comparison signal generation circuit illustrated in FIG. 5.

FIGS. 10 to 12 are diagrams illustrating a bit organization of the semiconductor package illustrated in FIG. 1.

DETAILED DESCRIPTION

Figure 2:
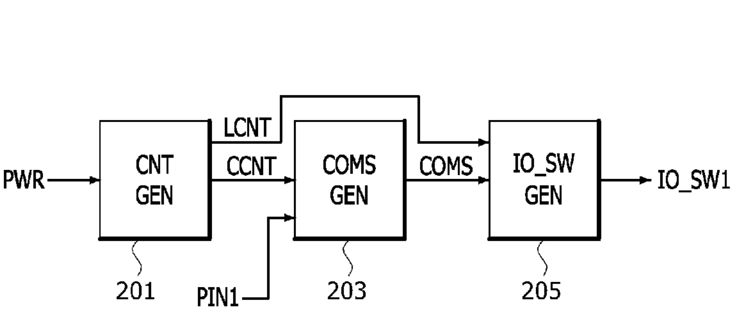
FIG. 2 is a block diagram illustrating a configuration according to an embodiment of a first input/output control circuit included in the semiconductor package illustrated FIG. 1.

In the following description of embodiments, when a parameter is referred to as being "predetermined," it may be intended to mean that a value of the parameter is determined in advance when the parameter is used in a process or an algorithm. The value of the parameter may be set when the process or the algorithm starts or may be set during a period that the process or the algorithm is executed.

The terms such as "first" and "second" used to distinguish various components are not limited by the components. For example, a first element may be termed a second element, and conversely, a second element may be termed a first element.

Further, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A logic "high" level and a logic "low" level may be used to describe logic levels of electric signals. A signal having a logic "high" level may be distinguished from a signal having a logic "low" level. For example, when a signal having a first voltage correspond to a signal having a logic "high" level, a signal having a second voltage correspond to a signal having a logic "low" level. In an embodiment, the logic "high" level may be set as a voltage level which is higher than a voltage level of the logic "low" level. Meanwhile, logic levels of signals may be set to be different or opposite according to the embodiments. For example, a certain signal having a logic "high" level in one embodiment may be set to have a logic "low" level in another embodiment.

The term "logic bit set" may mean a combination of logic levels of bits included in a signal. When the logic level of each of the bits included in the signal is changed, the logic bit set of the signal may be set differently. For example, when the signal includes 2 bits, when the logic level of each of the 2 bits included in the signal is "logic low level, logic low level", the logic bit set of the signal may be set as the first logic bit set, and when the logic level of each of the two bits included in the signal is "a logic low level and a logic high level", the logic bit set of the signal may be set as the second logic bit set.

Various embodiments of the present disclosure will be described hereinafter in more detail with reference to the accompanying drawings. However, the embodiments described herein are for illustrative purposes only and are not intended to limit the scope of the present disclosure.

Figure 1:
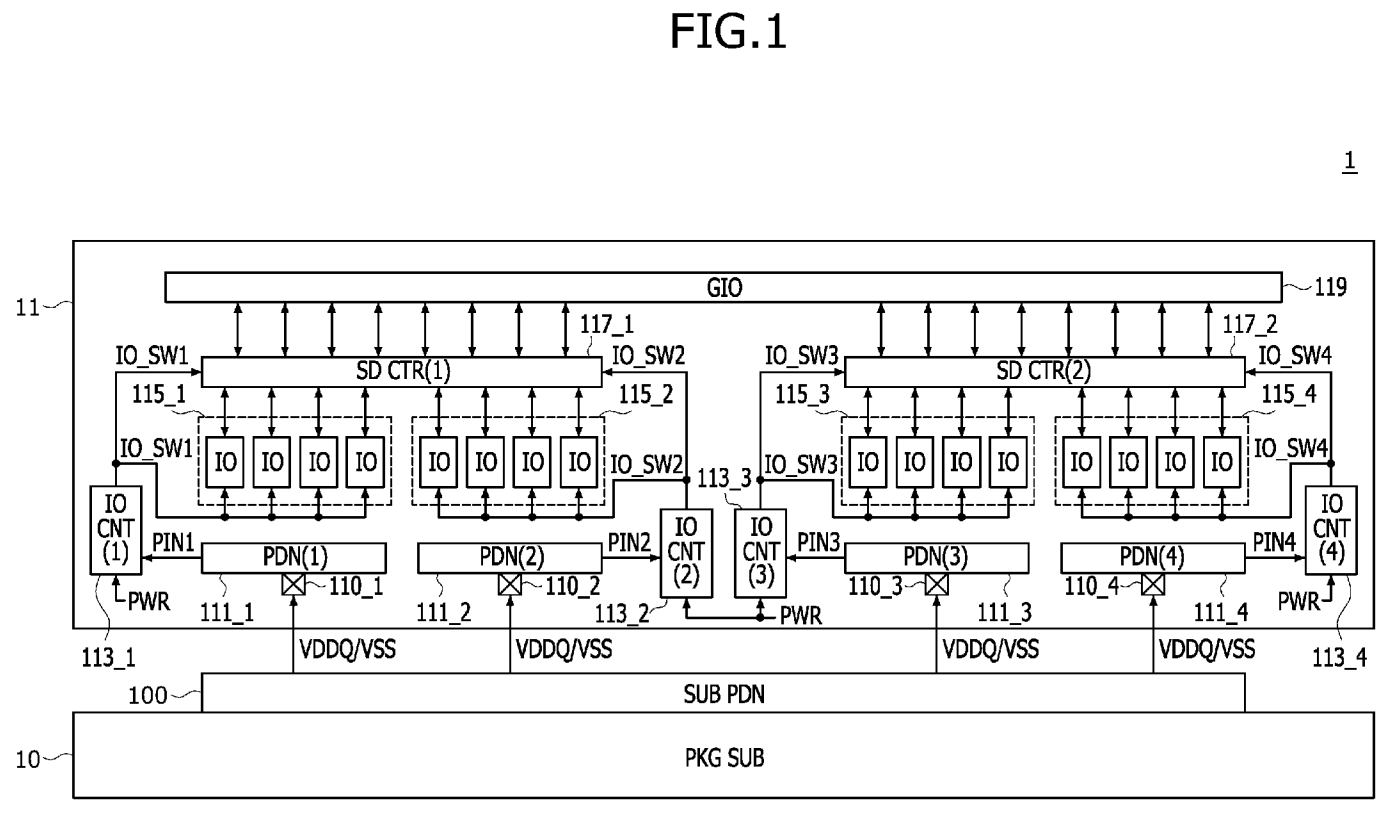

FIG. 1 is a block diagram illustrating a configuration of a semiconductor package 1 according to an embodiment of the present disclosure.

As illustrated in FIG. 1, the semiconductor package 1 may include a package substrate 10 and a semiconductor chip 11. The package substrate 10 may receive operation voltages VDDQ and VSS from an external device, such as a controller (1002 in FIGS. 13 and 2300 in FIG. 14). The package substrate 10 may supply the operation voltages VDDQ and VSS to the semiconductor chip 11 through a substrate voltage distribution circuit 100. The operation voltages VDDQ and VSS may include a data input/output voltage VDDQ used for a data input/output operation and a ground voltage VSS. The semiconductor chip 11 may perform a data input/output operation according to the bit organization set based on the operation voltages VDDQ and VSS supplied through the substrate voltage distribution circuit 100.

The semiconductor chip 11 may include first to fourth voltage pads 110_1~110_4, first to fourth voltage distribution circuits (PDN(1)~PDN(4)) 111_1~111_4, first to fourth input/output control circuits (IO CNT(1)~IO CNT(4)) 113_1~113_4, first to fourth data input/output groups (IOs) 115_1~115_4, a first data selection control circuit (SD CTR(1)) 117_1, a second data selection control circuit (SD CTR(2) 117_2, and a global input/output circuit (GIO) 119.

The first voltage distribution circuit 111_1 may receive the operation voltages VDDQ and VSS supplied from the substrate voltage distribution circuit 100 through the first voltage pad 110_1. The first voltage distribution circuit 111_1 may generate a first input voltage PIN1 based on the operation voltages VDDQ and VSS. More specifically, the first voltage distribution circuit 111_1 may output the data input/output voltage VDDQ as the first input voltage PIN1 when the data input/output voltage VDDQ is supplied from the substrate voltage distribution circuit 100 and may output the ground voltage VSS as the first input voltage PIN1 when the ground voltage VSS is supplied from the substrate voltage distribution circuit 100. The first voltage distribution circuit 111_1 may apply the first input voltage PIN1 to the first input/output control circuit 113_1.

The first input/output control circuit 113_1 may receive the first input voltage PIN1 from the first voltage distribution circuit 111_1. The first input/output control circuit 113_1 may generate a first input/output switching signal IO_SW1 based on a power-up signal PWR and the first input voltage PIN1. The power-up signal PWR may be activated when a supply voltage VDD supplied from an external device is increased to have a predetermined voltage level. More specifically, the first input/output control circuit 113_1 may generate the first input/output switching signal IO_SW1 that is activated when the first input voltage PIN1 is the data input/output voltage VDDQ, and may generate the first input/output switching signal IO_SW1 that is deactivated when the first input voltage PIN1 is the ground voltage VSS. The first input/output control circuit 113_1 may apply the first input/output switching signal IO_SW1 to the first data input/output group 115_1.

The first data input/output group 115_1 may receive the first input/output switching signal IO_SW1 from the first input/output control circuit 113_1. The first data input/output group 115_1 may include a plurality of input/output circuits IOs, the activation statuses of which are controlled based on the first input/output switching signal IO_SW1. As an example, the first data input/output group 115_1 may include four input/output circuits to perform a data input/output operation for 4-bit data. The plurality of input/output circuits IOs included in the first data input/output group 115_1 may perform the data input/output operation when the first input/output switching signal IO_SW1 is activated. More specifically, when the first input/output switching signal IO_SW1 is activated, the plurality of input/output circuits IOs included in the first data input/output group 115_1 may transmit the data (not illustrated) received from the external device, such as the controller (1002 in FIGS. 13 and 2300 in FIG. 14) to the first data selection control circuit 117_1 or may output the data (not illustrated) output through the first data selection control circuit 117_1 to the external device.

The second voltage distribution circuit 111_2 may receive the operation voltages VDDQ and VSS supplied from the substrate voltage distribution circuit 100 through the second voltage pad 110_2. The second voltage distribution circuit 111_2 may generate a second input voltage PIN2 based on the operation voltages VDDQ and VSS. More specifically, the second voltage distribution circuit 111_2 may output the data input/output voltage VDDQ as the second input voltage PIN2 when the data input/output voltage VDDQ is supplied from the substrate voltage distribution circuit 100 and may output the ground voltage VSS as the second input voltage PIN2 when the ground voltage VSS is supplied from the substrate voltage distribution circuit 100. The second voltage distribution circuit 111_2 may apply the second input voltage PIN2 to the second input/output control circuit 113_2.

The second input/output control circuit 113_2 may receive the second input voltage PIN2 from the second voltage distribution circuit 111_2. The second input/output control circuit 113_2 may generate a second input/output switching signal IO_SW2 based on the power-up signal PWR and the second input voltage PIN2. More specifically, the second input/output control circuit 113_2 may generate the second input/output switching signal IO_SW2 that is activated when the second input voltage PIN2 is the data input/output voltage VDDQ and may generate the second input/output switching signal IO_SW2 that is deactivated when the second input voltage PIN2 is the ground voltage VSS. The second input/output control circuit 113_2 may apply the second input/output switching signal IO_SW2 to the second data input/output group 115_2.

The second data input/output group 115_2 may receive the second input/output switching signal IO_SW2 from the second input/output control circuit 113_2. The second data input/output group 115_2 may include a plurality of input/output circuits IOs, the activation statuses of which are controlled based on the second input/output switching signal IO_SW2. As an example, the second data input/output group 115_2 may include four input/output circuits IOs to perform a data input/output operation for the four-bit data. The plurality of input/output circuits IOs included in the second data input/output group 115_2 may perform the data input/output operation when the second input/output switching signal IO_SW2 is activated. More specifically, when the second input/output switching signal IO_SW2 is activated, the plurality of input/output circuits IOs included in the second data input/output group 115_2 may transmit the data (not illustrated) received from the external device to the first data selection control circuit 117_1 or may output the data (not illustrated) output through the first data selection control circuit 117_1 to the external device.

The first data selection control circuit 117_1 may receive the first input/output switching signal IO_SW1 from the first input/output control circuit 113_1 and may receive the second input/output switching signal IO_SW2 from the second input/output control circuit 113_2. The second data input/output group 115_2 may perform a data input/output operation based on the first input/output switching signal IO_SW1 and the second input/output switching signal IS_SW2. As an example, when the first input/output switching signal IO_SW1 is activated, the first data selection control circuit 117_1 may transmit the data (not illustrated) received from the first data input/output group 115_1 to the global input/output line GIO or may output the data (not illustrated) output through the global input/output line GIO to the first data input/output group 115_1. In another example, when the second input/output switching signal IO_SW2 is activated, the first data selection control circuit 117_1 may transmit the data (not illustrated) received from the second data input/output group 115_2 to the global input/output line GIO or may output the data (not illustrated) output through the global input/output line GIO to the second data input/output group 115_2.

The third voltage distribution circuit 111_3 may receive the operation voltages VDDQ and VSS supplied from the substrate voltage distribution circuit 100 through the third voltage pad 110_3. The third voltage distribution circuit 111_3 may generate a third input voltage PIN3 based on the operation voltages VDDQ and VSS. More specifically, the third voltage distribution circuit 111_3 may output the data input/output voltage VDDQ as the third input voltage PIN3 when the data input/output voltage VDDQ is supplied from the substrate voltage distribution circuit 100 and may output the ground voltage VSS as the third input voltage PIN3 when the ground voltage VSS is supplied from the substrate voltage distribution circuit 100. The third voltage distribution circuit 111_3 may apply the third input voltage PIN3 to the third input/output control circuit 113_3.

The third input/output control circuit 113_3 may receive the third input voltage PIN3 from the third voltage distribution circuit 111_3. The third input/output control circuit 113_3 may generate a third input/output switching signal IO_SW3 based on the power-up signal PWR and the third input voltage PIN3. More specifically, the third input/output control circuit 113_3 may generate the third input/output switching signal IO_SW3 that is activated when the third input voltage PIN3 is the data input/output voltage VDDQ and may generate the third input/output switching signal IO_SW3 that is deactivated when the third input voltage PIN3 is the ground voltage VSS. The third input/output control circuit 113_3 may apply the third input/output switching signal IO_SW3 to the third data input/output group 115_3.

The third data input/output group 115_3 may receive the third input/output switching signal IO_SW3 from the third input/output control circuit 113_3. The third data input/output group 115_3 may include a plurality of input/output circuits IOs, the activation statuses of which are controlled based on the third input/output switching signal IO_SW3. As an example, the third data input/output group 115_3 may include four input/output circuits IOs to perform a data input/output operation for the four-bit data. The plurality of input/output circuits IOs included in the third data input/output group 115_3 may perform the data input/output operation when the third input/output switching signal IO_SW3 is activated. More specifically, when the third input/output switching signal IO_SW3 is activated, the plurality of input/output circuits IOs included in the third data input/output group 115_3 may transmit the data (not illustrated) received from the external device to the second data selection control circuit 117_2 or may output the data (not illustrated) output through the second data selection control circuit 117_2 to the external device.

The fourth voltage distribution circuit 111_4 may receive the operation voltages VDDQ and VSS supplied from the substrate voltage distribution circuit 100 through the fourth voltage pad 110_4. The fourth voltage distribution circuit 111_4 may generate a fourth input voltage PIN4, based on the operation voltages VDDQ and VSS. More specifically, the fourth voltage distribution circuit 111_4 may output the data input/output voltage VDDQ as the fourth input voltage PIN4 when the data input/output voltage VDDQ is supplied from the substrate voltage distribution circuit 100 and may output the ground voltage VSS as the fourth input voltage PIN4 when the ground voltage VSS is supplied from the substrate voltage distribution circuit 100. The fourth voltage distribution circuit 111_4 may apply the fourth input voltage PIN4 to the fourth input/output control circuit 113_4.

The fourth input/output control circuit 113_4 may receive the fourth input voltage PIN4 from the fourth voltage distribution circuit 111_4. The fourth input/output control circuit 113_4 may generate a fourth input/output switching signal IO_SW4 based on the power-up signal PWR and the fourth input voltage PIN4. More specifically, the fourth input/output control circuit 113_4 may generate the fourth input/output switching signal IO_SW4 that is activated when the fourth input voltage PIN4 is the data input/output voltage VDDQ and may generate the fourth input/output switching signal IO_SW4 that is deactivated when the fourth input voltage PIN4 is the ground voltage VSS. The fourth input/output control circuit 113_4 may apply the fourth input/output switching signal IO_SW4 to the fourth data input/output group 115_4.

The fourth data input/output group 115_4 may receive the fourth input/output switching signal IO_SW4 from the fourth input/output control circuit 113_4. The fourth data input/output group 115_4 may include a plurality of input/output circuits IOs, the activation statuses of which are controlled based on the fourth input/output switching signal IO_SW4. As an example, the fourth data input/output group 115_4 may include four input/output circuits IOs to perform a data input/output operation for the four-bit data. The plurality of input/output circuits IOs included in the fourth data input/output group 115_4 may perform the data input/output operation when the fourth input/output switching signal IO_SW4 is activated. More specifically, when the fourth input/output switching signal IO_SW4 is activated, the plurality of input/output circuits IOs included in the fourth data input/output group 115_4 may transmit the data (not illustrated) received from the external device to the second data selection control circuit 117_2 or may output the data (not illustrated) output through the second data selection control circuit 117_2 to the external device.

The second data selection control circuit 117_2 may receive the third input/output switching signal IO_SW3 from the third input/output control circuit 113_3 and may receive the fourth input/output switching signal IO_SW4 from the fourth input/output control circuit 113_4. The fourth data input/output group 115_4 may perform a data input/output operation based on the third input/output switching signal IO_SW3 and the fourth input/output switching signal IO_SW4. As an example, when the third input/output switching signal IO_SW3 is activated, the second data selection control circuit 117_2 may transmit the data (not illustrated) received from the third data input/output group 115_3 to the global input/output line GIO or may output the data (not illustrated) output through the global input/output line GIO to the third data input/output group 115_3. In another example, when the fourth input/output switching signal IO_SW4 is activated, the second data selection control circuit 117_2 may transmit the data (not illustrated) received from the fourth data input/output group 115_4 to the global input/output line GIO or may output the data (not illustrated) output through the global input/output line GIO to the fourth data input/output group 115_4.

FIG. 2 is a block diagram illustrating a configuration of a first input/output control circuit 113_1A according to an embodiment of the first input/output control circuit 113_1 of FIG. 1. As illustrated in FIG. 2, the first input/output control circuit 113_1A may include a control signal generation circuit (CNT GEN) 201, a composite comparison signal generation circuit (COMS GEN) 203, and an input/output switching signal generation circuit (IO_SW GEN) 205.

The control signal generation circuit 201 may generate a latch control signal LCNT and a comparison control signal CCNT based on the power-up signal PWR. The control signal generation circuit 201 may generate the latch control signal LCNT that is activated after a first delay period (td1 in FIG. 4) elapses from a point in time at which the supply voltage VDD rises to a preset voltage level and the power-up signal PWR is activated. The control signal generation circuit 201 may generate the comparison control signal CCNT that is activated during a preset comparison period (td1+td2 in FIG. 4) from the point in time at which the power-up signal PWR is activated.

The composite comparison signal generation circuit 203 may receive the comparison control signal CCNT from the control signal generation circuit 201. The composite comparison signal generation circuit 203 may generate a composite comparison signal COMS based on the comparison control signal CCNT and the first input voltage PIN1. The composite comparison signal generation circuit 203 may detect a voltage level of the first input voltage PIN1 to generate the composite comparison signal COMS during the comparison period in which the comparison control signal CCNT is activated. The composite comparison signal generation circuit 203 may generate the composite comparison signal COMS, the logic level of which is determined according to the voltage level of the first input voltage PIN1 detected during the comparison period. As an example, the composite comparison signal generation circuit 203 may generate the composite comparison signal COMS that is at a first logic level when the voltage level of the first input voltage PIN1 detected during the comparison period is equal to or higher than a reference voltage level. As another example, the composite comparison signal generation circuit 203 may generate the composite comparison signal COMS that is at a second logic level when the voltage level of the first input voltage PIN1 detected during the comparison period is lower than the reference voltage level. Because the composite comparison signal generation circuit 203 may detect the voltage level of the first input voltage PIN1 only during the comparison period to generate the composite comparison signal COMS, unnecessary power consumption may be prevented.

The input/output switching signal generation circuit 205 may receive the latch control signal LCNT from the control signal generation circuit 201 and may receive the composite comparison signal COMS from the composite comparison signal generation circuit 203. The input/output switching signal generation circuit 205 may generate the first input/output switching signal IO_SW1 based on the latch control signal LCNT and the composite comparison signal COMS. When the latch control signal LCNT is activated, the input/output switching signal generation circuit 205 may latch the composite comparison signal COMS and may output the latched composite comparison signal COMS as the first input/output switching signal IO_SW1.

Figure 3:
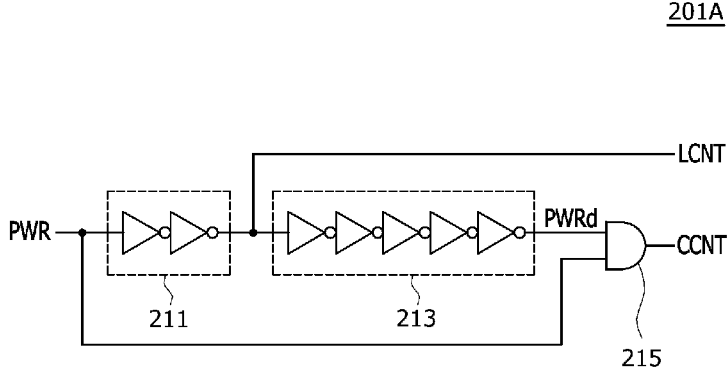
FIG. 3 is a circuit diagram according to an embodiment of a control signal generation circuit included in the first input/output control circuit illustrated in FIG. 2.
Figure 4:
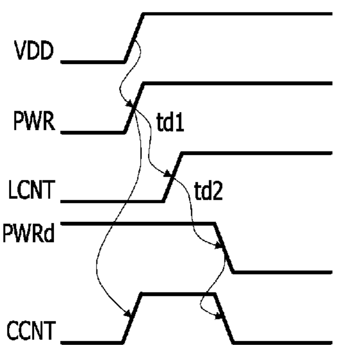
FIG. 4 is a timing diagram illustrating an operation of the control signal generation circuit illustrated in FIG. 3.

FIG. 3 is a circuit diagram of a control signal generation circuit 201A according to an embodiment of the control signal generation circuit 201 of FIG. 2, and FIG. 4 is a timing diagram illustrating an operation of the control signal generation circuit 201A of FIG. 3.

As illustrated in FIG. 3, the control signal generation circuit 201A may include a delay circuit 211, a reverse delay circuit 213, and a comparison period setting circuit 215.

As illustrated in FIGS. 3 and 4, the delay circuit 211 may delay the power-up signal PWR for a first delay period td1 to generate the latch control signal LCNT that is activated at a logic "high" level after being delayed by the first delay period td1 from a point in time at which the supply voltage VDD rises to a preset voltage level and the power-up signal PWR is activated at a logic "high" level. In addition, the reverse delay circuit 213 may inversely delay the latch control signal LCNT for a second delay period td2 to generate a delayed power-up signal PWRd that is transitioned to a logic "low" level from a logic "high" level after being delayed by the second delay period td2 from a point in time at which the latch control signal LCNT is activated at a logic "high" level. In addition, the comparison period setting circuit 215 may perform a logical multiplication operation on the power-up signal PWR and the delayed power-up signal PWRd to generate the comparison control signal CCNT that is activated during the comparison period td1+td2 in which both the power-up signal PWR and the delayed power-up signal PWRd are activated at a logic "high" level.

Figure 5:
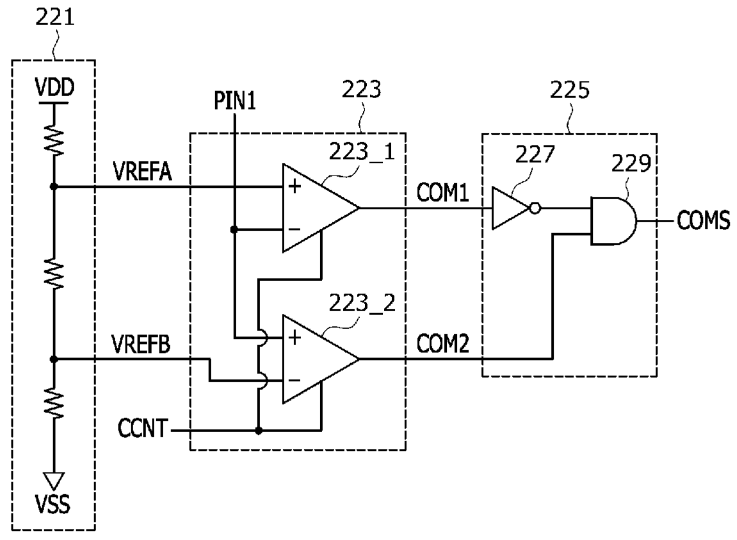
FIG. 5 is a circuit diagram according to an embodiment of a composite comparison signal generation circuit included in the first input/output control circuit illustrated in FIG. 2.

FIG. 5 is a circuit diagram of a composite comparison signal generation circuit 203A according to an embodiment of the composite comparison signal generation circuit 203, and FIG. 6 is a timing diagram illustrating an operation of the composite comparison signal generation circuit 203A of FIG. 5.

As illustrated in FIG. 5, the composite comparison signal generation circuit 203A may include a reference voltage generation circuit 221, a comparison circuit 223, and a composite circuit 225. The reference voltage generation circuit 221 may include a plurality of resistor devices connected between the supply voltage VDD and the ground voltage VSS and may perform voltage-division for the supply voltage VDD to generate a first reference voltage VREFA and a second reference voltage VREFB. The comparison circuit 223 may receive the first reference voltage VREFA and the second reference voltage VREFB from the reference voltage generation circuit 221. The comparison circuit 223 may include a first comparator 223_1 and a second comparator 223_2. The first comparator 223_1 may compare the first reference voltage VREFA with the first input voltage PIN1 to generate a first comparison signal COM1. The first comparator 223_1 may generate the first comparison signal COM1 that is at a logic "low" level when the first input voltage PIN1 is equal to or higher than the first reference voltage VREFA and may generate the first comparison signal COM1 that is at a logic "high" level when the first input voltage PIN1 is lower than the first reference voltage VREFA. The second comparator 223_2 may compare the second reference voltage VREFB with the first input voltage PIN1 to generate a second comparison signal COM2. The second comparator 223_2 may generate the second comparison signal COM2 that is at a logic "high" level when the first input voltage PIN1 is equal to or higher than the second reference voltage VREFB and may generate the second comparison signal COM2 that is at a logic "low" level when the first input voltage PIN1 is lower than the second reference voltage VREFB. The composite circuit 225 may receive the first comparison signal COM1 and the second comparison signal COM2 from the comparison circuit 223. The composite circuit 225 may include an inverter 227 and a AND gate 229. The inverter 227 may inversely buffer the first comparison signal COM1. The AND gate 229 may perform a AND operation by receiving an output of the inverter 227 and the second comparison signal COM2 to generate the composite comparison signal COMS. The composite circuit 225 may generate the composite comparison signal COMS based on the first comparison signal COM1 and the second comparison signal COM2. The composite circuit 225 may generate the composite comparison signal COMS, the logic level of which is set according to a logic bit set of the first comparison signal COM1 and the second comparison signal COM2. The composite circuit 225 may generate the composite comparison signal COMS that is at a logic "high" level based on the first comparison signal COM1 and the second comparison signal COM2. Specifically, the composite comparison signal COMS may be generated at a logic "high" level when the first comparison signal COM1 is at a logic "low" level and the second comparison signal COM2 is at a logic "high" level based on the first input voltage PIN1 being equal to or higher than the first reference voltage VREFA. On the other hand, composite circuit 225 may generate the composite comparison signal COMS that is at a logic "low" level when the first comparison signal COM1 is at a logic "high" level based on the first input voltage PIN1 being lower than the first reference voltage VREFA.

The operation of the composite comparison signal generation circuit 203A of FIG. 5 will be described with reference to FIGS. 5 and 6, but the operation may be divided into a case in which the first input voltage PIN1 is equal to or higher than the first reference voltage VREFA, a case in which the first input voltage PIN1 is lower than the first reference voltage VREFA and equal to or higher than the second reference voltage VREFB, and a case in which the first input voltage PIN1 is lower than the second reference voltage VREFB as follows.

First, when the first input voltage PIN1 is equal to or higher than the first reference voltage VREFA, the first comparator 223_1 may generate the first comparison signal COM1 that is at a logic "low" level 'L', and the second comparator 223_2 may generate the second comparison signa COM2 that is at a logic "high" level 'H'. In this case, the composite comparison signal COMS may be set to have a logic "high" level 'H'.

Next, when the first input voltage PIN1 is lower than the first reference voltage VREFA and equal to or higher than the second reference voltage VREFB, the first comparator 223_1 may generate the first comparison signal COM1 that is at a logic "high" level 'H', and the second comparator 223_2 may generate the second comparison signa COM2 that is at a logic "high" level 'H'. In this case, the composite comparison signal COMS may be set to have a logic "low" level 'L'.

Next, when the first input voltage PIN1 is lower than the second reference voltage VREFB, the first comparator 223_1 may generate the first comparison signal COM1 that is at a logic "high" level 'H', and the second comparator 223_2 may generate the second comparison signa COM2 that is at a logic "low" level 'L'. In this case, the composite comparison signal COMS may be set to have a logic "low" level 'L'.

Figure 7:
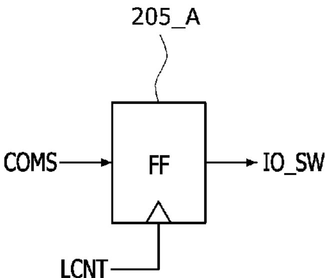
FIG. 7 is a circuit diagram according to an embodiment of an input/output switching signal generation circuit included in the first input/output control circuit illustrated in FIG. 2.

FIG. 7 is a circuit diagram illustrating an input/output switching signal generation circuit 205A according to an embodiment of the first input/output switching signal generation circuit 205 of FIG. 2.

As illustrated in FIG. 7, the input/output switching signal generation circuit 205A may be implemented with a flip-flop that can latch the composite comparison signal COMS when the latch control signal LCNT is activated and that can output the latched composite comparison signal COMS as the first input/output switching signal IO_SW1.

Figure 8:
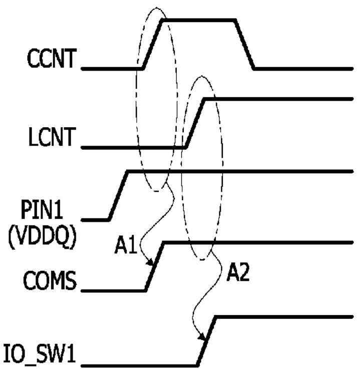
FIGS. 8 and 9 are timing diagrams illustrating an operation of the input/output switching signal generation circuit illustrated in FIG. 7.
Figure 9:
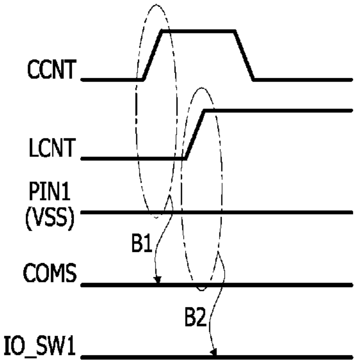

FIGS. 8 and 9 are timing diagrams illustrating an operation of the input/output switching signal generation circuit 113_1A illustrated in FIG. 2.

As illustrated in A1 of FIG. 8, when the first input voltage PIN1 set to the data input/output supply voltage VDDQ is received during the comparison period in which the comparison control signal CCNT is activated at a logic "high" level, the composite comparison signal COMS may be generated at a logic "high" level. In addition, as illustrated in A2 of FIG. 8, the composite comparison signal COMS that is at a logic "high" level may be output as the first input/output switching signal IO_SW1 when the latch control signal LCNT is activated at a logic "high" level. When the first input/output switching signal IO_SW1 is activated at a logic "high" level, the first data input/output group 115_1 and the first data selection control circuit 117_1 may perform a data input/output operation.

Figure 10:
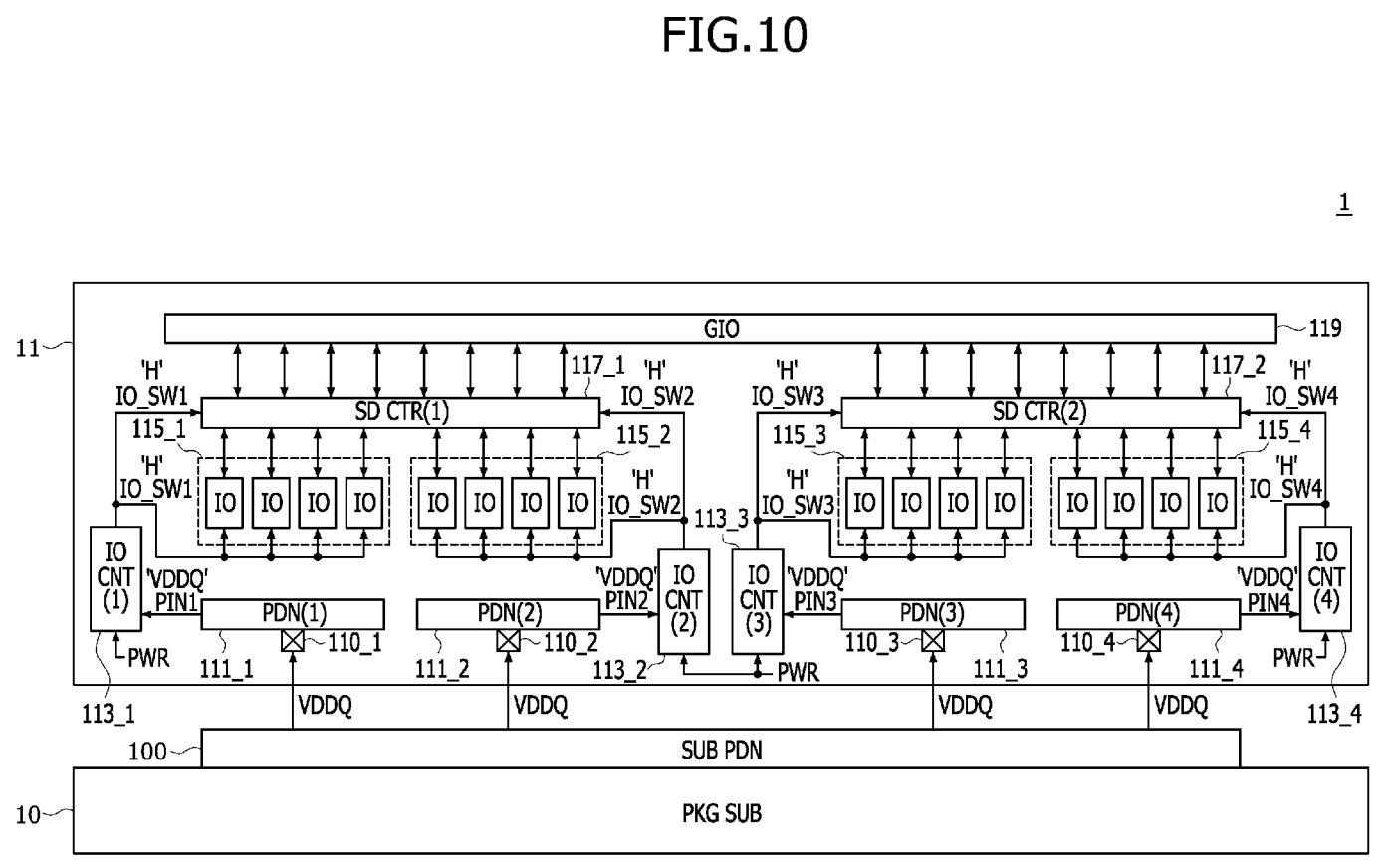
Figure 11:
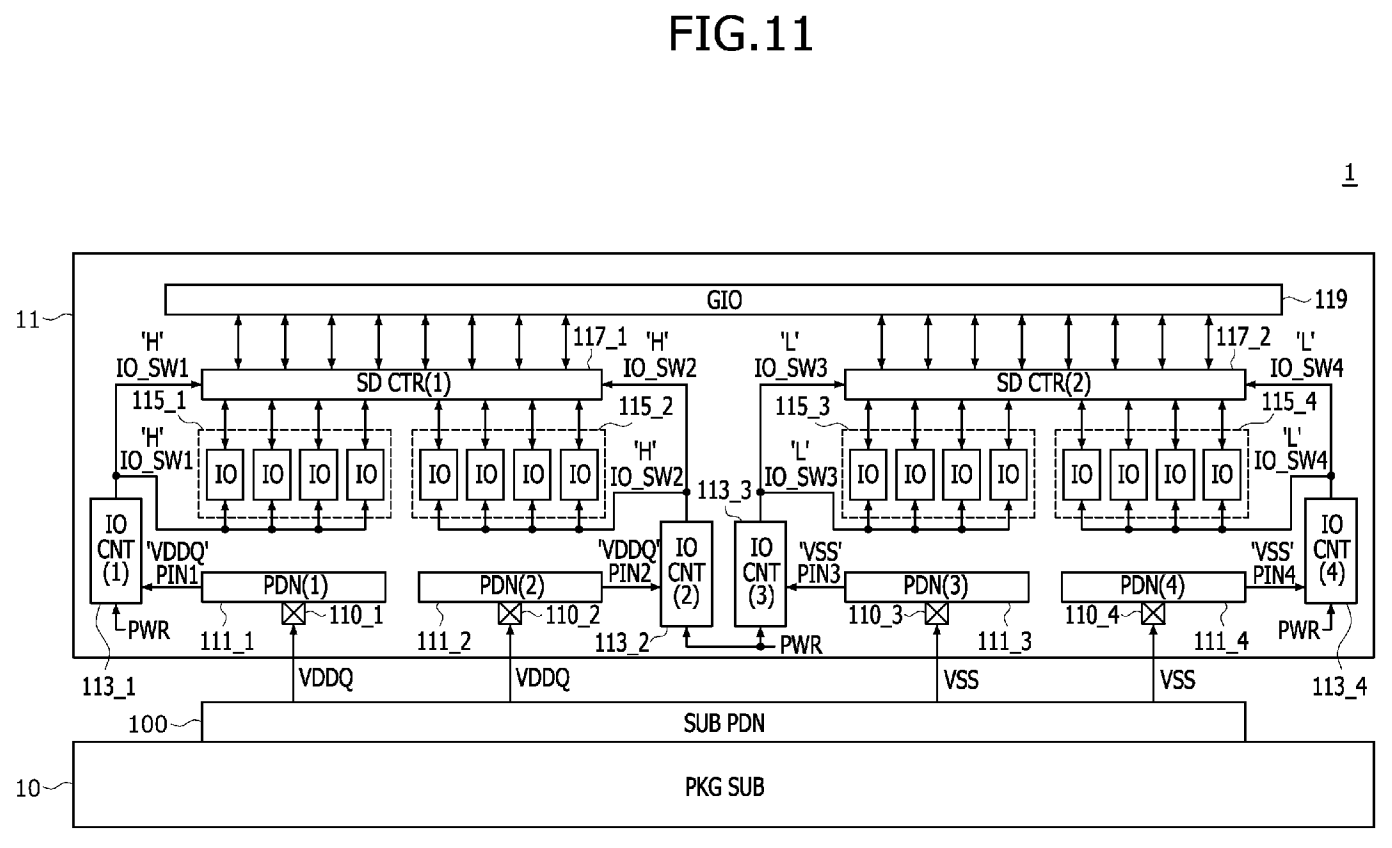
Figure 12:
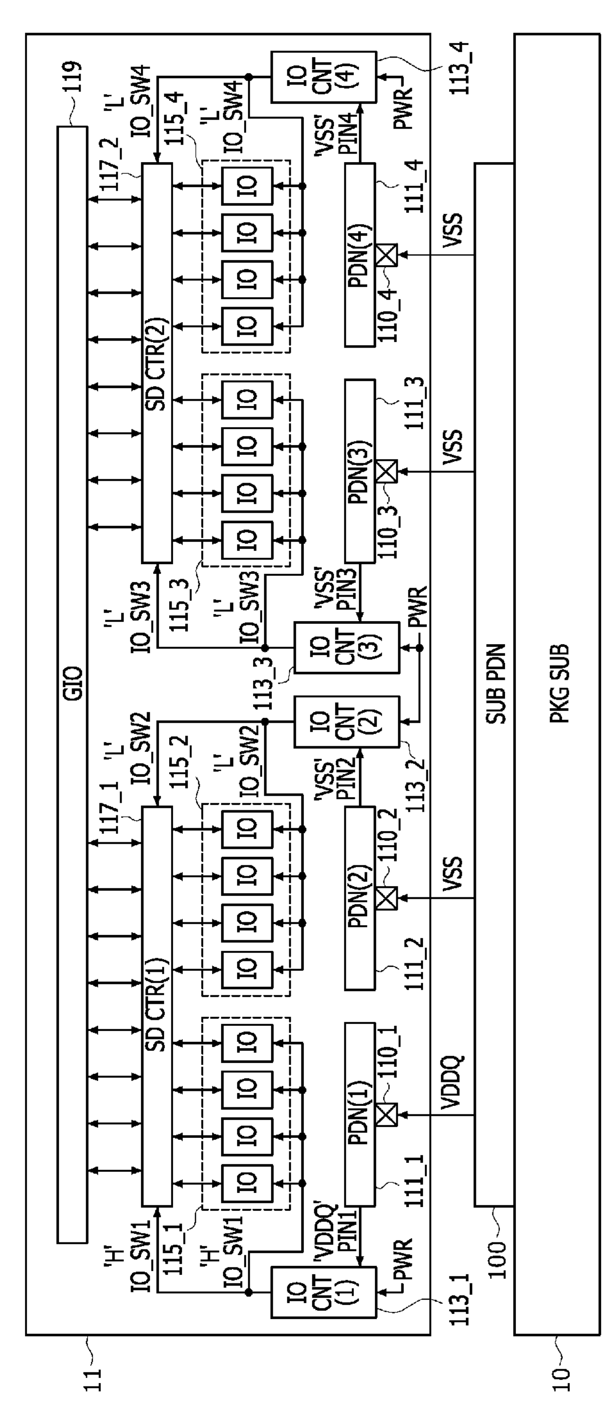

FIGS. 10 to 12 are diagrams illustrating the bit organization of the semiconductor package 1 illustrated in FIG. 1.

An operation for setting the bit organization of the semiconductor package 1 of FIG. 1 to X16 will be described with reference to FIG. 10.

When the package substrate 10 supplies the data input/output voltage VDDQ through the first to fourth voltage pads 110_1~110_4 through the substrate voltage distribution circuit 100, the first to fourth input/output control circuits 113_1~113_4 may receive the first to fourth input voltages PIN1~PIN4 that are set to the data input/output voltage VDDQ from the first to fourth voltage distribution circuit 111_1~111_4. The first input/output control circuit 113_1 that receives the first input voltage PIN1 set to the data input/output voltage VDDQ may generate the first input/output switching signal IO_SW1 that is activated at a logic "high" level 'H'. The first data input/output group 115_1 and the first data selection control circuit 117_1 may perform the data input/output operations based on the first input/output switching signal IO_SW1. The second input/output control circuit 113_2 that receives the second input voltage PIN2 set to the data input/output voltage VDDQ may generate the second input/output switching signal IO_SW2 that is activated at a logic "high" level 'H'. The second data input/output group 115_2 and the second data selection control circuit 117_2 may perform the data input/output operations based on the second input/output switching signal IO_SW2. The third input/output control circuit 113_3 that receives the third input voltage PIN3 set to the data input/output voltage VDDQ may generate the third input/output switching signal IO_SW3 that is activated at a logic "high" level 'H'. The third data input/output group 115_3 and the third data selection control circuit 117_3 may perform the data input/output operations based on the third input/output switching signal IO_SW3. The fourth input/output control circuit 113_4 that receives the fourth input voltage PIN4 set to the data input/output voltage VDDQ may generate the fourth input/output switching signal IO_SW4 that is activated at a logic "high" level 'H'. The fourth data input/output group 115_4 and the fourth data selection control circuit 117_4 may perform the data input/output operations based on the fourth input/output switching signal IO_SW4.

An operation for setting the bit organization of the semiconductor package 1 of FIG. 1 to X8 will be described with reference to FIG. 11.

When the package substrate 10 supplies the data input/output voltage VDDQ through the first and second voltage pads 110_1 and 110_2 through the substrate voltage distribution circuit 100, the first and second input/output control circuits 113_1 and 113_2 may receive the first and second input voltages PIN1 and PIN2 set to the data input/output voltage VDDQ from the first and second voltage distribution circuits 111_1 and 111_2, respectively. The first input/output control circuit 113_1 that receives the first input voltage PIN1 set to the data input/output voltage VDDQ may generate the first input/output switching signal IO_SW1 that is activated at a logic "high" level 'H'. The first data input/output group 115_1 and the first data selection control circuit 117_1 may perform data input/output operations based on the first input/output switching signal IO_SW1. The second input/output control circuit 113_2 that receives the second input voltage PIN2 set to the data input/output voltage VDDQ may generate the second input/output switching signal IO_SW2 that is activated at a logic "high" level 'H'. The second data input/output group 115_2 and the second data selection control circuit 117_2 may perform the data input/output operations based on the second input/output switching signal IO_SW2.

When the package substrate 10 supplies the ground voltage VSS through the third and fourth voltage pads 110_3 and 110_4 through the substrate voltage distribution circuit 100, the third and fourth input/output control circuits 113_3 and 113_4 may receive the third and fourth input voltages PIN3 and PIN4 set to the ground voltage VSS from the third and fourth voltage distribution circuits 111_3 and 111_4, respectively. The third input/output control circuit 113_3 that receives the third input voltage PIN3 set to the ground voltage VSS may generate the third input/output switching signal IO_SW3 that is deactivated at a logic "low" level 'L'. The third data input/output group 115_3 and the third data selection control circuit 117_3 may stop performing the data input/output operations based on the third input/output switching signal IO_SW3. The fourth input/output control circuit 113_4 that receives the fourth input voltage PIN4 set to the ground voltage VSS may generate the fourth input/output switching signal IO_SW4 that is deactivated at a logic "low" level 'L'. The fourth data input/output group 115_4 and the fourth data selection control circuit 117_4 may stop performing the data input/output operations based on the fourth input/output switching signal IO_SW4. Because the third data input/output group 115_3, the third data selection control circuit 117_3, fourth data input/output group 115_4, and the fourth data selection control circuit 117_4 may stop performing the data input/output operations, power consumption caused by the supply of the data input/output voltage VDDQ for the data input/output operations may be blocked.

An operation for setting the bit organization of the semiconductor package 1 of FIG. 1 to X4 will be described with reference to FIG. 12.

When the package substrate 10 supplies the data input/output voltage VDDQ through the first voltage pad 110_1 through the substrate voltage distribution circuit 100, the first input/output control circuit 113_1 may receive the first input voltage PIN1 set to the data input/output voltage VDDQ from the first voltage distribution circuit 111_1. The first input/output control circuit 113_1 that receives the first input voltage PIN1 set to the data input/output voltage VDDQ may generate the first input/output switching signal IO_SW1 that is activated at a logic "high" level 'H'. The first data input/output group 115_1 and the first data selection control circuit 117_1 may perform the data input/output operations based on the first input/output switching signal IO_SW1.

When the package substrate 10 supplies the ground voltage VSS through the second to fourth voltage pads 110_2~110_4, respectively through the substrate voltage distribution circuit 100, the second to fourth input/output control circuits 113_2~113_4 may receive the second to fourth input voltages PIN2~PIN4 set to the ground voltage VSS from the second to fourth voltage distribution circuits 111_2~111_4. The second input/output control circuit 113_2 that receives the second input voltage PIN2 set to the ground voltage VSS may generate the second input/output switching signal IO_SW2 that is deactivated at a logic "low" level 'L'. The second data input/output group 115_2 and the second data selection control circuit 117_2 may stop performing the data input/output operations based on the second input/output switching signal IO_SW2. The third input/output control circuit 113_3 that receives the third input voltage PIN3 set to the ground voltage VSS may generate the third input/output switching signal IO_SW3 that is deactivated at a logic "low" level 'L'. The third data input/ output group 115_3 and the third data selection control circuit 117_3 may stop performing the data input/output operations based on the third input/output switching signal IO_SW3. The fourth input/output control circuit 113_4 that receives the fourth input voltage PIN4 set to the ground voltage VSS may generate the fourth input/output switching signal IO_SW4 that is deactivated at a logic "low" level 'L'. The fourth data input/output group 115_4 and the fourth data selection control circuit 117_4 may stop performing the data input/output operations based on the fourth input/output switching signal IO_SW4. Because the second data input/output group 115_2, the second data selection control circuit 117_2, third data input/output group 115_3, and the third data selection control circuit 117_3, the fourth data input/output group 115_4, and the fourth data selection control circuit 117_4 may stop performing the data input/output operations, power consumption caused by the supply of the data input/output voltage VDDQ for data input/output operations may be blocked.

Figure 13:
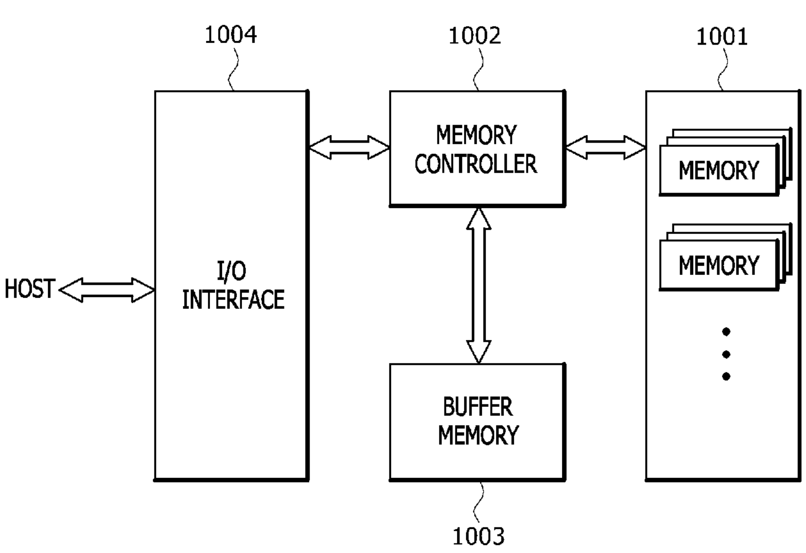
FIG. 13 is a block diagram illustrating a configuration of an electronic system according to an embodiment of the present disclosure.

FIG. 13 is a block diagram illustrating a configuration of an electronic system 1000 according to an embodiment of the present disclosure. The semiconductor package 1 described above with reference to FIGS. 1 to 12 may be applied to electronic systems including a memory system, a graphic system, a computing system, a mobile system, and the like. For example, referring to FIG. 13, the electronic system 1000 according to an embodiment of the present disclosure may include a data storage unit 1001, a memory controller 1002, a buffer memory device 1003, and an input/output interface 1004.

The data storage unit 1001 may store data (not illustrated) applied from the memory controller 1002 according to a control signal from the memory controller 1002 and may read out the stored data (not illustrated) to output the data to the memory controller 1002. Meanwhile, the data storage unit 1001 may include a non-volatile memory device capable of continuously storing data without loss, even when power is cut off. The non-volatile memory device may be implemented with a flash memory (NOR flash memory, NAND flash memory) device, a phase change random access memory (PRAM) device, a resistive random access memory (RRAM) device, a spin transfer torque random access memory (STTRAM) device, or a magnetic random access memory (MRAM) device.

The memory controller 1002 may decode a command applied from an external device (host device) through the input/output interface 1004 and may control data input/output for the data storage unit 1001 and the buffer memory device 1003 according to a decoding result. In FIG. 13, the memory controller 1002 is illustrated as one block, but a controller that controls the data storage unit 1001 and a separate controller that controls the buffer memory device 1003, the buffer memory device 1003 being a volatile memory device, may be configured independently.

The buffer memory device 1003 may temporarily store data to be processed by the memory controller 1002, that is, data (not illustrated) input and output to and from the data storage unit 1001. The buffer memory device 1003 may store data (not illustrated) applied from the memory controller 1002 according to a control signal. The buffer memory device 1003 may include the semiconductor package 1 described above with reference to FIGS. 1 to 12. The buffer memory device 1003 may read out stored data and output the data to the memory controller 1002. The buffer memory device 1003 may include volatile memory devices, such as a dynamic random access memory (DRAM) device, a mobile DRAM device, and a static random access memory (SRAM) device.

The input/output interface 1004 may provide a physical connection between the memory controller 1002 and an external device (host device) to allow the memory controller 1002 to receive a control signal for data input/output to/from the external device and to exchange data with the external device. The input/output interface 1004 may include one of a variety of interface protocols, such as universal serial bus (USB), multi-media card (MMC), peripheral component interconnect-express (PCI-E), serial attached SCSI (SAS), advanced technology attachment (ATA), serial ATA (SATA), parallel ATA (PATA), small computer system interface (SCSI), enhanced small disk interface (ESDI), integrated drive electronics (IDE), and the like.

The electronic system 1000 may be used as an auxiliary memory device of a host device or an external storage device. The electronic system 1000 may include a solid state disk (SSD), a universal serial bus (USB) memory device, a secure digital (SD) card, a mini secure digital (SD) card, a micro secure digital (micro SD) card, a secure digital high capacity (SDHC) card, a memory stick card, a smart media (SM) card, a multi-media card (MMC), an embedded multi-media card (eMMC), a compact flash (CF), and the like.

Figure 14:
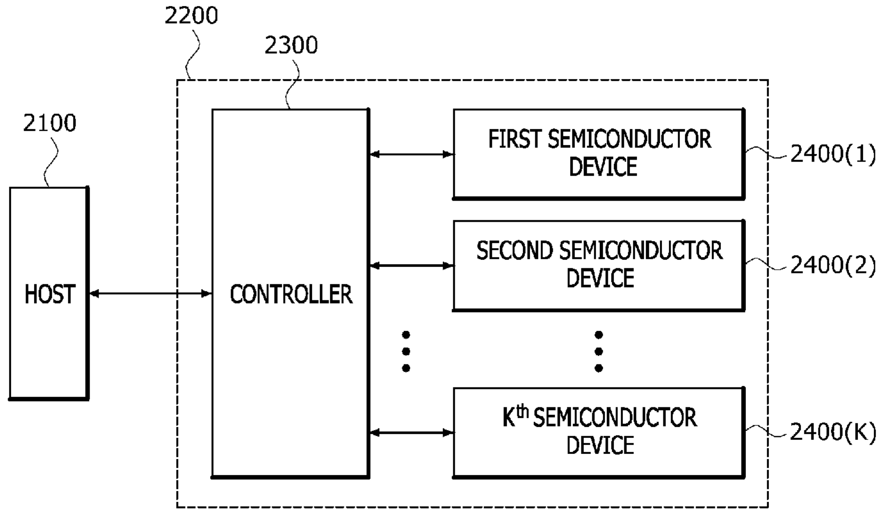
FIG. 14 is a block diagram illustrating a configuration of an electronic system according to another embodiment of the present disclosure.

FIG. 14 is a block diagram illustrating a configuration of an electronic system 2000 according to another embodiment of the present disclosure. As illustrated in FIG. 14, the electronic system 2000 may include a host 2100 and a semiconductor system 2200.

The host 2100 and the semiconductor system 2200 may transmit signals to each other through interface protocols. The interface protocols used between the host 2100 and the semiconductor system 2200 may include a multi-media card (MMC), an enhanced small disk interface (ESDI), integrated drive electronics (IDE), peripheral component interconnect-express (PCI-E), advanced technology attachment (ATA), serial ATA (SATA), parallel ATA (PATA), serial attached SCSI (SAS), universal serial bus (USB), and the like.

The semiconductor system 2200 may include a controller 2300 and semiconductor devices 2400(1:K).

Each of the semiconductor devices 2400(1:K) may include the semiconductor package 1 described above with reference to FIGS. 1 to 12. Each of the semiconductor devices 2400(1:K) may be implemented with one of a dynamic random access memory (DRAM) device, a phase change random access memory (PRAM) device, a resistive random access memory (RRAM) device, a magnetic random access memory (MRAM) device, and ferroelectric random access memory (FRAM) device.

Concepts have been disclosed in conjunction with some embodiments as described above. Those skilled in the art will appreciate that various modifications, additions, and substitutions are possible, without departing from the scope and spirit of the present disclosure. Accordingly, the embodiments disclosed in the present specification should be considered from not a restrictive standpoint but rather from an illustrative standpoint. The scope of the concepts is not limited to the above descriptions but defined by the accompanying claims, and all of distinctive features in the equivalent scope should be construed as being included in the concepts.

What is claimed is:

1. A semiconductor chip comprising:

a first input/output control circuit configured to generate a first input/output switching signal that controls a first data input/output operation on a first data input/output group according to a first input voltage generated based on an operation voltage, wherein the first input/output control circuit is configured to generate a comparison control signal based on a power-up signal, and to activate or deactivate the first input/output switching signal by comparing the first input voltage to a reference voltage during a comparison period in which the comparison control signal is activated; and a second input/output control circuit configured to generate a second input/output switching signal that controls a second data input/output operation on a second data input/output group according to a second input voltage generated based on the operation voltage, wherein the first data input/output group and the second data input/output group are each associated with a respective voltage pad of the semiconductor chip and each data input/output group is selectively activated when the data input/output voltage is supplied to the respective voltage pad and is not activated when the ground voltage is supplied to the respective voltage pad, such that activation of the data input/output groups establishes the number of bits simultaneously input and output by the semiconductor chip.

2. The semiconductor chip of claim 1, wherein the first input/output control circuit is configured to detect a voltage level of the first input voltage during a comparison period defined by the comparison control signal, and wherein the comparison period begins when a supply voltage is increased to a predetermined voltage level to generate the first input/output switching signal.

3. The semiconductor chip of claim 2, wherein the first input/output control circuit is configured to:

generate the first input/output switching signal that is activated when the first input voltage is equal to or higher than the reference voltage during the predetermined comparison period, and generate the first input/output switching signal that is deactivated when the first input voltage is lower than the reference voltage during the predetermined comparison period.

4. The semiconductor chip of claim 1, wherein the first input/output control circuit includes:

a control signal generation circuit configured to generate a latch control signal and a comparison control signal based on a power-up signal;

a composite comparison signal generation circuit configured to generate a composite comparison signal based on the comparison control signal and the first input voltage; and an input/output switching signal generation circuit configured to generate the first input/output switching signal from the composite comparison signal based on the latch control signal.

5. The semiconductor chip of claim 4, wherein the control signal generation circuit includes:

a delay circuit configured to generate the latch control signal that is activated after a first delay period elapses from a point in time at which the power-up signal is activated;

an inversion delay circuit configured to generate a delayed power-up signal by inversely delaying the latch control signal by a second delay period; and a comparison period setting circuit configured to generate the comparison control signal based on the power-up signal and the delayed power-up signal.

6. The semiconductor chip of claim 4, wherein the composite comparison signal generation circuit is configured to detect a voltage level of the first input voltage during the predetermined comparison period in which the comparison control signal is activated to generate the composite comparison signal.

7. The semiconductor chip of claim 4, wherein the input/output switching signal generation circuit is configured to latch the composite comparison signal when the latch control signal is activated and configured to output the latched composite comparison signal as the first input/output switching signal.

8. The semiconductor chip of claim 1, further comprising a first voltage distribution circuit configured to generate the first input voltage based on the operation voltage, wherein the operation voltage includes a data input/output voltage and a ground voltage.

9. The semiconductor chip of claim 8, wherein the first voltage distribution circuit is configured to:

output the data input/output voltage as the first input voltage when the operation voltage is the data input/output voltage; and output the ground voltage as the first input voltage when the operation voltage is the ground voltage.

10. The semiconductor chip of claim 1, further comprising a second voltage distribution circuit that generates a second input voltage based on the operation voltage, wherein the operation voltage includes a data input/output voltage and a ground voltage.

11. The semiconductor chip of claim 10, wherein the second voltage distribution circuit is configured to:

output the data input/output voltage as the second input voltage when the operation voltage is the data input/output voltage; and output the ground voltage as the second input voltage when the operation voltage is the ground voltage.

12. The semiconductor chip of claim 1, further comprising a data selection control circuit configured to control the first data input/output operation and the second data input/output operation based on the first input/output switching signal and the second input/output switching signal, respectively.

13. The semiconductor chip of claim 12, wherein the data selection control circuit is configured to:

transmit data received from the first data input/output group to a global input/output line or output data outputted through the global input/output line to the first data input/output group when the first input/output switching signal is activated, and block the first data input/output operation when the first input/output switching signal is deactivated.

14. The semiconductor chip of claim 12, wherein the data selection control circuit is configured to:

transmit data received from the second data input/output group to a global input/output line or output data outputted through the global input/output line to the second data input/output group when the second input/output switching signal is activated, and block the second data input/output operation when the second input/output switching signal is deactivated.

15. A semiconductor chip comprising:

a first voltage distribution circuit configured to generate a first input voltage based on an operation voltage;

a first input/output control circuit configured to generate a first input/output switching signal that controls a first data input/output operation on a first data input/output group according to the first input voltage, wherein the first input/output control circuit is configured to generate a comparison control signal based on a power-up signal, and to activate or deactivate the first input/output switching signal by comparing the first input voltage to a reference voltage during a comparison period in which the comparison control signal is activated;

a second voltage distribution circuit configured to generate a second input voltage based on the operation voltage; and a second input/output control circuit configured to generate a second input/output switching signal that controls a second data input/output operation on a second data input/output group according to the second input voltage, wherein the first data input/output group and the second data input/output group are each associated with a respective voltage pad of the semiconductor chip, and each data input/output group is selectively activated when the data input/output voltage is supplied to the respective voltage pad and is not activated when the ground voltage is supplied to the respective voltage pad, such that activation of the data input/output groups establishes the number of bits simultaneously input and output by the semiconductor chip.

16. The semiconductor chip of claim 15, wherein the first voltage distribution circuit is configured to:

output a data input/output voltage as the first input voltage when the operation voltage is the data input/output voltage; and output a ground voltage as the first input voltage when the operation voltage is the ground voltage.

17. The semiconductor chip of claim 15, wherein the first input/output control circuit is configured to detect a voltage level of the first input voltage during a comparison period defined by the comparison control signal, and wherein the comparison period begins when a supply voltage is increased to a predetermined voltage level to generate the first input/output switching signal.

18. The semiconductor chip of claim 15, wherein the first input/output control circuit includes:

a control signal generation circuit configured to generate a latch control signal and a comparison control signal based on a power-up signal;

a composite comparison signal generation circuit configured to generate a composite comparison signal, based on the comparison control signal and the first input voltage; and an input/output switching signal generation circuit configured to generate the first input/output switching signal from the composite comparison signal based on the latch control signal.

19. The semiconductor chip of claim 15, further comprising a data selection control circuit configured to perform the first data input/output operation and the second data input/output operation based on the first input/output switching signal and the second input/output switching signal.

20. A semiconductor package comprising:

a package substrate configured to apply an operation voltage including a data input/output voltage and a ground voltage through a substrate voltage distribution circuit; and a semiconductor chip configured to generate a first input voltage and a second input voltage based on the operation voltage, to generate a first input/output switching signal that controls a first data input/output operation on a first data input/output group according to the first input voltage, wherein the first input/output control circuit is configured to generate a comparison control signal based on a power-up signal, and to activate or deactivate the first input/output switching signal by comparing the first input voltage to a reference voltage during a comparison period in which the comparison control signal is activated, and to generate a second input/output switching signal that controls a second data input/output operation on a second data input/output group according to the second input voltage, wherein the first data input/output group and the second data input/output group are each associated with a respective voltage pad of the semiconductor chip, and each data input/output group is selectively activated when the data input/output voltage is supplied to the respective voltage pad and is not activated when the ground voltage is supplied to the respective voltage pad, such that activation of the data input/output groups establishes the number of bits simultaneously input and output by the semiconductor chip.

* * * * *